US007136948B2

(12) United States Patent
Hirata et al.

(10) Patent No.: US 7,136,948 B2
(45) Date of Patent: Nov. 14, 2006

(54) STATUS NOTIFICATION APPARATUS STATUS NOTIFICATION METHOD AND STATUS NOTIFICATION PROGRAM

(75) Inventors: Mikiko Hirata, Tokorozawa (JP); Yukiko Kajita, Tokorozawa (JP); Takashi Tsuneshige, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 261 days.

(21) Appl. No.: 10/666,561

(22) Filed: Sep. 22, 2003

(65) Prior Publication Data

US 2004/0122945 A1 Jun. 24, 2004

(30) Foreign Application Priority Data

Sep. 20, 2002 (JP) .......................... P2002-276385

(51) Int. Cl.
*G06F 13/00* (2006.01)

(52) U.S. Cl. .......................... 710/104; 710/106; 710/8; 710/12; 710/15; 700/19

(58) Field of Classification Search ................ 710/104, 710/106, 8, 15; 700/12
See application file for complete search history.

(56) References Cited

U.S. PATENT DOCUMENTS 5,809,331 A * 9/1998 Staats et al. .................. 710/10
5,883,621 A * 3/1999 Iwamura ...................... 725/37
5,990,927 A * 11/1999 Hendricks et al. .......... 725/132
2002/0026540 A1* 2/2002 Smyers .......................... 710/8

FOREIGN PATENT DOCUMENTS

EP 0 899 655 A 3/1999
EP 1 024 493 A 8/2000

OTHER PUBLICATIONS

Interim Guidellines for Examinaiton of Patent Applications for Patent Subject Matter Eligibility, pp. 55-57.*

* cited by examiner

*Primary Examiner*—Glenn A. Auve
*Assistant Examiner*—Justin I. King
(74) *Attorney, Agent, or Firm*—Sughrue Mion, PLLC

(57) ABSTRACT

To provide a status display apparatus or the like which can permit the user of a plurality of nodes connected by a serial bus according to the serial bus standard to recognize whether the transmission of the audio information or the like has become possible by the connection between the nodes.

A status display apparatus included in a receiver R for transmitting/receiving audio information with a player to display the status of the receiver comprises a system control unit 13 and an indicator 15B which makes inquiry about whether the player P has a configuration for transmitting/receiving the audio information to/from the receiver R and upon confirmation that the player P has the required configuration, displays that the player P has such a configuration.

9 Claims, 2 Drawing Sheets

STATUS NOTIFICATION APPARATUS STATUS NOTIFICATION METHOD AND STATUS NOTIFICATION PROGRAM

BACKGROUND OF THE INVENTION

1. Field of the Invention

The present invention relates to a technical field of a status notification apparatus, a status notification method and a status notification program, or more in particular to a technical field of a status notification apparatus, a status notification method and a status notification program for notifying the user of the operating conditions, etc. of an information processing apparatus such as an information reproducing apparatus.

2. Description of the Related Art

In recent years, the IEEE1394 standard has been widely applied as a standard of a method for connecting an information reproducing apparatus such as a player for reproducing the audio information recorded in an optical disk, for example, and an amplifier unit (an amplifier) for amplifying the reproduced audio information and outputting it to a speaker or the like.

The IEEE1394 standard is officially referred to as "IEEE Std. 1394-1995 IEEE Standard for a High Performance Serial Bus", which is a standard used when the information reproducing apparatus and the amplifier are connected to each other by a serial bus constituted of a wire.

Next, an outline of the IEEE1394 standard will be explained in general terms. The IEEE1394 standard (hereinafter referred to simply as the serial bus standard) stipulates that a plurality of types of information processing apparatuses (hereinafter referred to simply as nodes) including the information reproducing apparatus and the amplifier described above are connected to each other by a serial bus, and information of a plurality of channels is transmitted between the nodes by time division. Hereat, according to this serial bus standard, a maximum of 63 different channels can be used for information transmission within the same series connected by a series of serial bus systems which do not include any branches.

Also, according to the serial bus standard, the information from the nodes is transmitted collectively in units called the isochronous cycle (where "cycle" indicates one cycle formed by time division on the serial bus). The isochronous cycle includes an isochronous transmission area containing the information (specifically, the image information, the audio information, etc.) transmitted in synchronism with the information contained in other isochronous cycles and an asynchronous transmission area containing the information (specifically, the control information for controlling the output, etc. of the image information or the audio information) transmitted asynchronously without regard to other information. The information existing in the isochronous transmission area is divided by time for each different channel so that different information is transmitted for each channel.

According to the aforementioned serial bus standard, the control information is transmitted at high speed from an information processing apparatus such as a personal computer. In this way, the electric home appliances and audio/visual devices such as an information reproducing apparatus can be centrally controlled. At the same time, the audio information or the like can be accurately transmitted between the nodes.

With the conventional nodes connected according to the serial bus standard described above, however, even when the audio information or the like is transmitted or the process for the transmission is actually executed with other nodes, the fact that the particular process is being executed is not indicated to the user.

In this case, the user of the node cannot recognize whether the audio information or the like is actually being transmitted or whether the node is in a position to transmit the audio information. Thus the problem is posed that even when the transmission of the audio information or the like becomes impossible or the desired music or the like cannot be heard for some reason or other, the user cannot recognize the cause thereof.

The unnecessary time is consumed to trace the cause of this problem, thereby leading to the problem that the user is driven into an extremely inconvenient situation.

SUMMARY OF THE INVENTION

This invention has been developed in view of this problem, and an object of the invention is to provide a status notification apparatus, a status notification method and a status notification program, wherein when a plurality of nodes are connected by a serial bus under the serial bus standard, as an example, the user can be rendered to recognize that the transmission of the audio information or the like is made possible by the particular connection.

The above object of the present invention can be achieved by a status notification apparatus for notifying the status of one information processing apparatus, included in the one information processing apparatus for transmitting/receiving information to/from other information processing apparatuses. The status notification apparatus comprises: an inquiry device for making an inquiry about whether the other information processing apparatuses have the function of transmitting/receiving the informatio; and a notification device for starting the notification upon confirmation by the inquiry by the inquiry device that the other information processing apparatuses have the function.

According to the status notification apparatus, since the notification device starts the notification upon confirmation by the inquiry by the inquiry device that the other information processing apparatuses have the function, the user of the one information processing apparatus can recognize that the information can be transmitted/received between the one information processing apparatus and the other information processing apparatuses.

In one aspect of the status notification apparatus, the notification device stops the notification upon confirmation by the inquiry device that the other information processing apparatuses have no the configuration after starting the notification.

According to this aspect, upon renewed confirmation that the other information processing has no configuration to transmit/receive the information to/from the one information processing, the notification device stops the notification upon confirmation. Therefore, the user of the one information processing can recognize that the transmission/receiving of the information is impossible with the other information processing.

The above object of the present invention can be achieved by a status notification apparatus for notifying the status of one information processing apparatus, included in the one information processing apparatus for transmitting/receiving information to/from other information processing apparatuses. The status notification apparatus comprises: a confirmation device for confirming whether the connection of a transmission path of the information is established between the other information processing apparatuses and the one information processing apparatus; and a notification device for starting the notification upon confirmation by the confirmation device that the connection is established.

According to the status notification apparatus, upon confirmation that the transmission/receiving of the information is actually made possible with the connection established between the other information processing and the one information processing apparatus, the notification device starts the notification upon confirmation by the confirmation device. Therefore, the user of the one information processing apparatus can recognize that the transmission/receiving of the information has actually become possible between the one information processing apparatus and the other information processing.

In one aspect of the status notification apparatus, the notification device stops the notification upon confirmation by the confirmation device that the connection is not established with the other information processing apparatuses after starting the notification.

According to this aspect, upon confirmation anew of the fact that the transmission/receiving of the information has become impossible with the other information processing, the notification device stops the notification upon confirmation by the confirmation device. Therefore, the user of the one information processing apparatus can recognize that the transmission/receiving of the information with the other information processing apparatuses has become impossible.

In another aspect of the status notification apparatus, the notification device switches a display device in off state to a turned-on state when starting the notification.

According to this aspect, since the notification device switches a display device in off state to a turned-on state when starting the notification, the required display operation can be realized with a simple configuration.

In further aspect of the status notification apparatus, the other information processing apparatuses and the one information processing apparatus are connected to each other by a serial bus governed by IEEE 1394 Standard.

According to this aspect, since the serial bus governed by IEEE 1394 Standard connects to the other information processing apparatuses and the one information processing apparatus each other, the information can be transmitted/received speedy.

The above object of the present invention can be achieved by a status notification method for notifying the status of one information processing apparatus for transmitting/receiving information to/from other information processing apparatuses. The status notification method comprises: an inquiry process for making an inquiry about whether the other information processing apparatuses have the function of transmitting/receiving the information; and a notification process for starting the notification upon confirmation by the inquiry that the other information processing apparatuses have the function.

According to the status notification method, since the notification upon confirmation is started by the inquiry that the other information processing apparatuses have the function, the user of the one information processing apparatus can recognize that the information can be transmitted/received between the one information processing apparatus and the other information processing apparatuses.

The above object of the present invention can be achieved by a status notification method for notifying the status of one information processing apparatus for transmitting/receiving information to/from other information processing apparatuses. The status notification method comprises: a confirmation process for confirming whether the connection of a transmission path of the information is established between the other information processing apparatuses and the one information processing apparatus; and a notification process for starting the notification upon confirmation by the confirmation device that the connection is established.

According to the status notification method, upon confirmation that the transmission/receiving of the information is actually made possible with the connection established between the other information processing and the one information processing apparatus, the notification upon confirmation is started. Therefore, the user of the one information processing apparatus can recognize that the transmission/receiving of the information has actually become possible between the one information processing apparatus and the other information processing.

The above object of the present invention can be achieved by a computer data signal embodied in a carrier wave. The computer data signal represent a sequence of instructions, which executed by a computer included in a status notification apparatus for notifying the status of one information processing apparatus, included in the one information processing apparatus for transmitting/receiving information to/from other information processing apparatuses, the instructions cause the computer to function as: an inquiry device for making an inquiry about whether the other information processing apparatuses have the function of transmitting/receiving the information; and a notification device for starting the notification upon confirmation by the inquiry by the inquiry device that the other information processing apparatuses have the function.

According to the computer data signal, the computer reads out the computer data signal from the carrier wave and the computer functions in such a manner that the notification upon confirmation is started by the inquiry that the other information processing apparatuses have the function. Thus, the user of the one information processing apparatus can recognize that the information can be transmitted/received between the one information processing apparatus and the other information processing apparatuses.

The above object of the present invention can be achieved by a computer data signal embodied in a carrier wave. The computer data signal represent a sequence of instructions, which executed by a computer included in a status notification apparatus for notifying the status of one information processing apparatus, included in the one information processing apparatus for transmitting/receiving information to/from other information processing apparatuses, the instructions cause the computer to function as: a confirmation device for confirming whether the connection of a transmission path of the information is established between the other information processing apparatuses and the one information processing apparatus; and a notification device for starting the notification upon confirmation by the confirmation device that the connection is established.

According to the computer data signal, the computer reads out the computer data signal from the carrier wave and the computer functions in such a manner that the notification upon confirmation is started when the transmission/receiving of the information is actually made possible with the connection established between the other information processing and the one information processing apparatus. Therefore, the user of the one information processing apparatus can recognize that the transmission/receiving of the information has actually become possible between the one information processing apparatus and the other information processing.

DESCRIPTION OF THE PREFERRED EMBODIMENTS

Next, preferred embodiments of the invention will be explained with reference to the drawings According to an embodiment of the invention described below, there is provided an information reproducing system comprising a player for reproducing the audio information recorded in an optical disk such as a DVD (digital versatile disk), a receiver for outputting (sounding) through a speaker by subjecting the audio information reproduced by the player to the amplification process and the waveform shaping process as preset, and a serial bus for connecting by wire the player and the receiver to each other in compliance with the serial bus standard.

First, a general configuration of an information reproducing system according to an embodiment will be explained with reference to FIG. 1. Incidentally, FIG. 1 is a block diagram showing an outline of the configuration of the player and the receiver included in the information reproducing system according to an embodiment.

Figure 1:
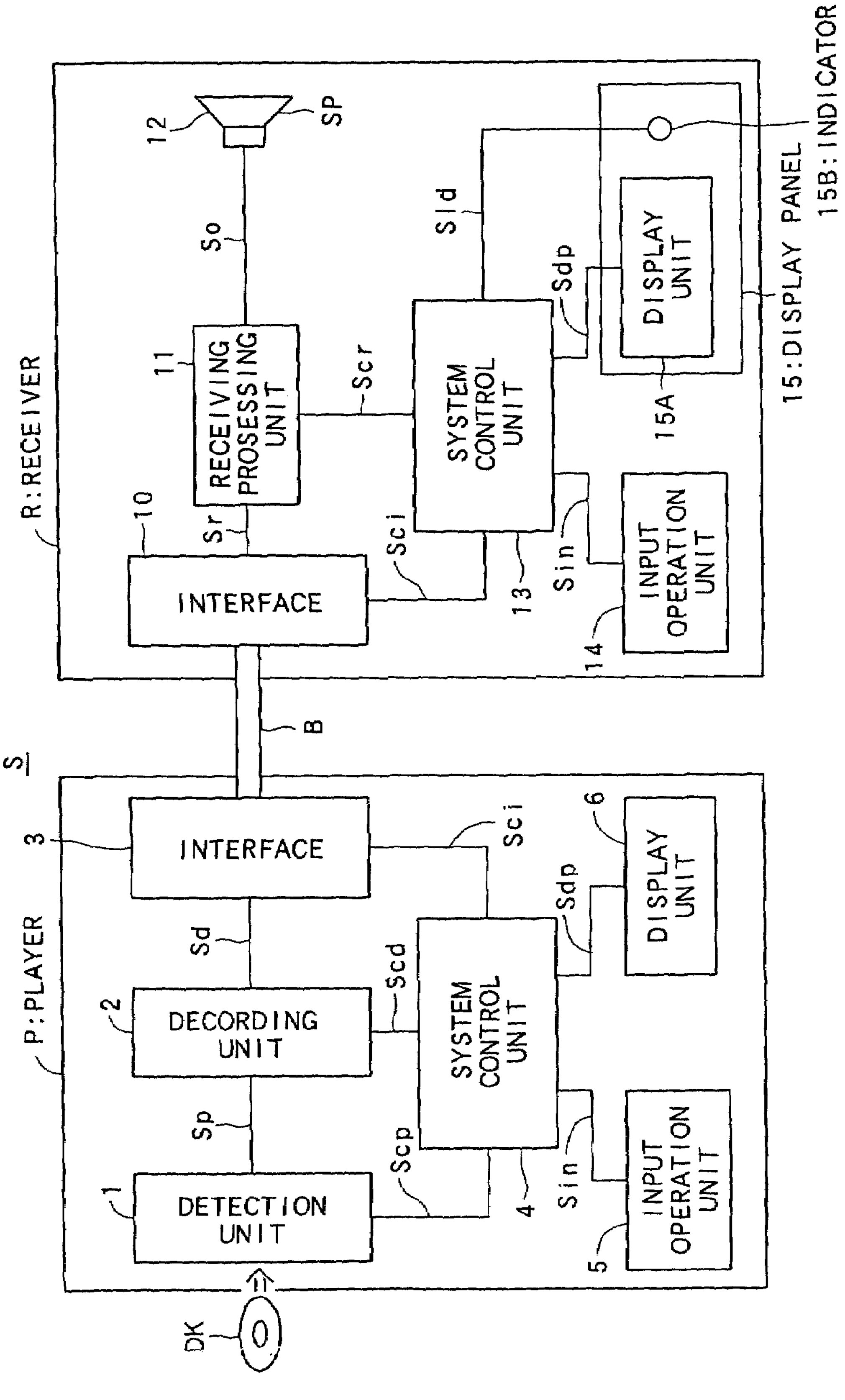
FIG. 1 is a block diagram showing a general configuration of an information reproducing system according to an embodiment.

As shown in FIG. 1, the information reproducing system S according to an embodiment is configured of a player P as one of the other information processing apparatuses, a receiver R as the one information processing apparatuses and a serial bus B for connecting the player P and the receiver R according to the serial bus standard.

Also, the player P includes a detection unit 1, a decoding unit 2, an interface 3, a system control unit 4, an input operation unit 5, and a display unit 6.

Further, the receiver R is configured of an interface 10, a receive processing unit 11, a speaker 12, a system control unit 13 as an inquiry device and a confirmation device, an input operation unit 14, and a display panel 15 including an indicator 15B as a notification device including a light-emitting element such as a LED (light-emitting diode) and a display unit 15A such as a liquid crystal display unit or the like.

Next, the overall operation will be explained.

First, the detection unit 1 in the player P includes a spindle motor for rotating an optical disk DK such as a DVD with audio information recorded therein, a pickup for optically detecting the audio information from the optical disk DK in rotation, and a processing unit for performing the preprocessing such as amplification preset for the detected audio information. Once the optical disk DK is loaded, the audio information recorded in the optical disk DK is optically detected under the control of the system control unit 4 using a control signal Scp, and a detection signal Sp corresponding to the detected audio information is generated and output to the decoding unit 2.

As a result, the decoding unit 2 decodes the audio information contained in the detection signal Sp under the control of the system control unit 4 using the control signal Scd, and generating the decoding information Sd, outputs it to the interface 3.

Next, the interface 3 subjects the decoding information Sd after decoding to the output interface processing based on the serial bus standard under the control of the system control unit 4 using the control signal Sci, and outputs the player output information to the receiver R through the serial bus B. In the process, the interface 3 divides the audio information contained in the decoding information Sd into isochronous packets (including the required sync information), and forming the player output information described above, sends it onto the serial bus B.

Also, an encryption unit not shown in the interface 3 encrypts the decoded audio information based on a preset encryption scheme as required and outputs it as the player output information to the serial bus B.

On the other hand, a series of the processes for controlling the operation of the player P is carried out by the user by way of the input operation unit 5, so that an operation signal Sin corresponding to the operation thus carried out is generated and output to the system control unit 4.

The system control unit 4 generates and outputs the control signals Scp, Scd and Sci for controlling the component members based on the operation signal Sin in order to perform the overall control operation of the component members of the player P so as to realize the process for reproducing the audio information.

Further, the information to be presented to the user in the overall control operation of the system control unit 4 is output from the system control unit 4 as display information Sdp.

The display unit 6 displays the information to be presented, based on the display information Sdp.

On the other hand, the interface 10 of the receiver R for receiving the player output information from the interface 3 executes the input interface process according to the serial bus standard against the player output information output through the serial bus B under the control of the system control unit 13 using the control signal Sci, and outputs the receive information Sr to the receive processing unit 11.

The receive processing unit 11 subjects the audio information contained in the receive information Sr generated to a predetermined receiving process such as amplification and waveform shaping under the control of the system control unit 13 using the control signal Scr. Thus, the output information So corresponding to the audio information is generated and output to an external speaker 12.

As a result, the speaker 12 releases the audio information contained in the output information So as a sound.

On the other hand, a series of the process for controlling the operation of the receiver R is carried out by the user through the input operation unit 14. Thus, an operation signal Sin corresponding to the process thus carried out is generated and output to the system control unit 13.

The system control unit 13 generates and outputs the control signals Scr and Sci to control the interface 10 and the receive processing unit 11 based on the operation signal Sin in order to perform the centralized control of the interface 10 and the receive processing unit 11 in such a manner as to realize the receiving and amplification process for the audio information including the indicator display control process shown in a flowchart described later.

Further, the information to be presented to the user for the centralized control operation by the system control unit 4 is output as display information Sdp from the system control unit 13.

The display unit 15A displays the aforementioned information to be presented, based on the display information Sdp.

In parallel with this, the system control unit 13 generates the control information Sld and outputs it to the indicator 15B in order to control the display state of the indicator 15B by carrying out the indicator display control process according to this embodiment described later.

Next, the indication display control process according to this embodiment which is mainly executed by the system control unit 13 and the interface 10 of the receiver R in the information reproducing system S having the configuration and the operation described above will be explained with reference to FIGS. 1 and 2.

Figure 2:
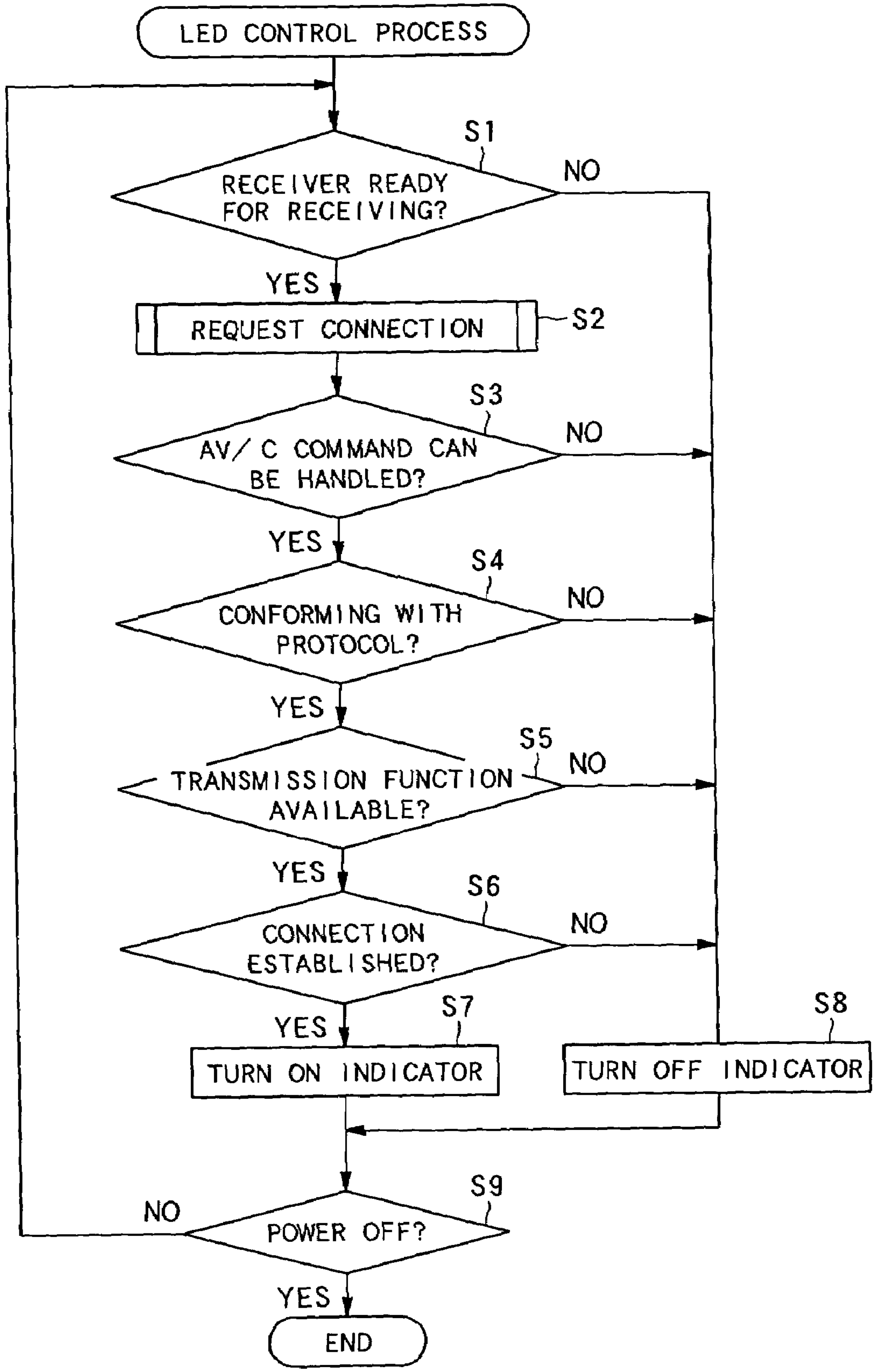
FIG. 2 is a flowchart showing the display control process according to an embodiment.

FIG. 2 is a flowchart showing the indicator display control process.

As shown in FIG. 2, in the indicator display control process according to this embodiment, it is confirmed first whether the player P and the receiver R are physically connected to each other by the serial bus B and whether the setting process required of the receiver R (i.e. the various setting processes required to receive and output the audio information reproduced by the player P through the serial bus B) is completed or not (step S1).

When it is determined in step S1 that the receiving of the audio information by the receiver R is physically impossible (NO in step S1), the control information Sld is output to the indicator 15B to turn off the indicator 15B (step S8) and the process proceeds to the next step S9.

The turn-off state in step S8 is defined to include the state in which the indicator 15B in on state is turned off and the state in which the indicator 15B in off state is kept turned off.

When it is determined in step S1 that the receiving of the audio information from the player P is physically possible by the receiver R YES in step S1), on the other hand, the request information is output from the system control unit 13 to the interface 10 as a control signal Sci to transfer to the state in which the transmission of the audio information under the serial bus standard to and from the player P (i.e. the state in which a transmission path for transmitting the audio information is established (i.e. the connection is established)) (step S2).

Based on the device information stored in the interface 10, it is confirmed whether the connected player P conforms with the well-known AV/C (consumer audio/video) command (officially called "AV/C digital interface command set") format defined under the serial bus standard (step S3). When a node failing to conform with the serial bus standard is connected and the interface in the particular node fails to conform with the AV/C command format and (NO in step S3), for example, it indicates that the process of transmitting the audio information to the particular node under the serial bus standard cannot be carried out. Thus, in order to turn off the indicator 15B, the control information Sld is output to the indicator 15B (step S8) and the process proceeds to the next step S9.

It is determined in step S3 that the interface 3 of the player P conforms with the AV/C command format (YES in step S3). Therefore, the next step is to confirm whether the interface 3 can execute the output process based on the A&M (audio & music) protocol well known as a protocol (communication rule) defined in the serial bus standard (step S4). When, like in step S3, a node not conforming with the serial bus standard is connected while the interface in the particular node is incapable of the output process based on the A&M protocol (NO in step S4), then, the receiver R is unable to carry out the receiving process even when one of the nodes thereof connected. Thus the process proceeds to steps S8 and S9.

In view of the fact that it is determined in step S4 that the interface 3 is capable of the output process based on the A&M protocol (YES in step S4), on the other hand, it is then confirmed whether the player P is equipped with the control function to enable the receiver R to utilize the audio information (step S5). The control function is defined as the function of a particular device to output the audio information or the like while the receiver R is capable of the receiving process when the connection is established with the receiver R.

When it is determined in step S5, like in step S3 or S4, that a node not conforming with the serial bus standard is connected and the particular node is not equipped with any of he control functions described above (NO in step S5), it indicates that the process of the audio information transmission to the particular node under the serial bus standard cannot be executed. Thus the process proceeds to steps S8 and S9.

In view of the fact that it is determined in step S5 that the player P is equipped with at least one of the control functions described above (YES in step S5), the control information is transmitted/received actually to/from the player P as required thereby to confirm whether the connection for audio information is actually established from the player P to the receiver R (step S6).

When it is determined in step S6 that the connection is not established actually for the audio information from the player P to the receiver R (NO in step S6), the process of transmitting the audio information to the receiver R under the serial bus standard cannot be executed. Thus, the process proceeds to steps S8 and S9.

When it is determined in step S6 that the connection for the audio information is actually established from the player P to the receiver R (YES in step S6), on the other hand, the control information Sld is output to the indicator 15B to turn on the indicator 15B (step S7).

Incidentally, the turn-on state in step S7 is defined to include the state in which the indicator 15B thus far in off state is turned on and the state in which the indicator 15B thus far in on state is kept turned on.

After completing the process for determining whether the indicator 15B is to be turned on (step S8) or turned off (step S9), the player P is kept constantly monitored as to whether the power switch thereof not shown is turned off or not (step S9). Once the same power switch is turned off (YES in step S9), the indicator display control process according to this embodiment is immediately terminated. When the power switch is not turned off (NO in step S9), on the other and, the process returns to step S1 and the series of process described above is repeated.

As explained above, with the indicator display control process according to this embodiment, the indicator 15B is turned on upon confirmation that the configuration is formed for transmitting/receiving the audio information between the player P and the receiver R. Thus, the user of the receiver R can recognize that the audio information can be transmitted/received between the player P and the receiver R.

Also, upon renewed confirmation that the player P has no configuration to transmit/receive the audio information to/from the receiver R, the indicator 15B is turned off. Therefore, the user of the receiver R can recognize that the transmission/receiving of the audio information is impossible with the player P.

Further, upon confirmation that the transmission/receiving of the audio information is actually made possible with the connection established between the player P and the receiver R, the indicator 15B is turned on. Therefore, the user of the receiver R can recognize that the transmission/receiving of the audio information has actually become possible between the receiver R and the player P.

Furthermore, upon confirmation anew of the fact that the transmission/receiving of the audio information has become impossible with the player P, the indicator 15B is turned off. Therefore, the user of the receiver R can recognize that the transmission/receiving of the audio information with the player P has become impossible.

Also, since the aforementioned display is carried out by turning on or off the indicator 15B, the required display operation can be realized with a simple configuration.

Further, the user can recognize whether the transmission of the audio information is possible or not as related to the connection between the player P and the receiver R using the serial bus B conforming with the serial bus standard.

With the embodiments described above, an explanation has been given about a case in which the transmission status (including the transmissible status) of the audio information is confirmed for the receiver R. Nevertheless, the invention is also applicable to other cases in which the transmission status for the player P is confirmed similarly. In such a case, the indicator display control process according to the embodiment described above is executed by the system control unit 4 in the player P and the indicator not shown.

In the embodiments described above, reference is made to a case in which the audio information is transmitted between the player P and the receiver R. Nevertheless, the invention is applicable also to a case in which the dynamic image information containing the audio information from the optical disk DK is detected and reproduced and output to an information processing apparatus which has both the image display function and the audio output function.

Further, unlike in the embodiments described above in which the required status is displayed by turning on or off the indicator 15B, a configuration is also possible in which the required transmission status is displayed on the display unit 6A using the character information or the pattern information, and so is a configuration in which the required transmission status is displayed using the sound. In such a case, the sound continues to be issued during the period corresponding to the case in which the indicator 15B according to the embodiment should be turned on and the sound is stopped during the period corresponding to the case in which the indicator 15B should be turned off. As another alternative, a configuration may be employed in which the sound is issued temporarily only at the time of transition from the time corresponding to the case in which the indicator 15B should be turned on to the time corresponding to the case in which the indicator 15B should be turned off, and also at the time of transition from the case in which the indicator 15B should be turned off to the the case in which the indicator 15B should be turned on.

Also, a program corresponding to the flowchart shown in FIG. 2 is recorded in an information recording medium such as a flexible disk or a hard disk, or recorded by being acquired through a network such as an internet, which is read and executed by a general-purpose microcomputer or the like. In this way, the microcomputer or the like may be rendered to exhibit the function of the system control unit 4.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-276385 filed on Sep. 20, 2002 including the specification, claims, drawings and summary is incorporated herein by reference in its entirety.

What is claimed is:

1. A status notification apparatus for notifying a status of a first information processing apparatus and a second information processing apparatus which has a reproducing unit for reproducing information, the first and second information processing apparatuses being interconnected for mutually transmitting/receiving the information, the status notification apparatus comprising:

an inquiry device equipped in the first information processing apparatus and making an inquiry about whether or not the second information processing apparatus has a function of transmitting/receiving the information and a control function of enabling the first information processing apparatus to utilize the information; and a notification device equipped in the first information processing apparatus and staffing the notification upon confirmation by the inquiry device that the second information processing apparatus has the function and the control function.

2. A status notification apparatus according to claim 1, wherein the notification device stops the notification upon confirmation by the inquiry device that the second information processing apparatus has no configuration to transmit/receive information after staffing the notification.

3. A status notification apparatus according to claim 1, wherein the notification device switches the display unit in off state to a turned-on state when staffing the notification.

4. A status notification apparatus according to claim 1, wherein the second information processing apparatus and the first information processing apparatus are connected to each other by a serial bus governed by IEEE (Institute of Electrical and Electronic Engineers) 1394 Standard.

5. A status notification apparatus according to claim 1, wherein the information comprises audio information.

6. A status notification method for notifying a status of a first information processing apparatus in a second information processing apparatus which has a reproducing unit for reproducing information, the first and second information processing apparatuses being interconnected for mutually transmitting/receiving the information, the status notification method comprising:

an inquiry process for making an inquiry about whether or not the second information processing apparatus has a function of transmitting/receiving the information and a control function of enabling the first information processing apparatus to utilize the information; and a notification process for staffing the notification upon confirmation by the inquiry that the second information processing apparatus has the function and the control function.

7. A status notification method according to claim 6, wherein the information comprises audio information.

8. A computer program embodied in a computer-readable medium and representing a sequence of instructions, which when executed by a computer included in a status notification apparatus for notifying a status of a first information processing apparatus and a second information processing apparatus which has a reproducing unit for reproducing information, the first and second information processing apparatuses being interconnected for mutually transmitting/receiving the information, the instructions cause the computer to function as:

an inquiry device for making an inquiry about whether or not the second information processing apparatus has a function of transmitting/receiving the information and a control function of enabling the first information processing apparatus to utilize the information; and a notification device for staffing the notification upon confirmation by the inquiry device that the second information processing apparatus has the function and the control function.

9. The computer program according to claim 8, wherein the information comprises audio information.

* * * * *